Dec. 11, 1945.  P. N. CURRY  2,390,642
VALVE
Filed March 17, 1943
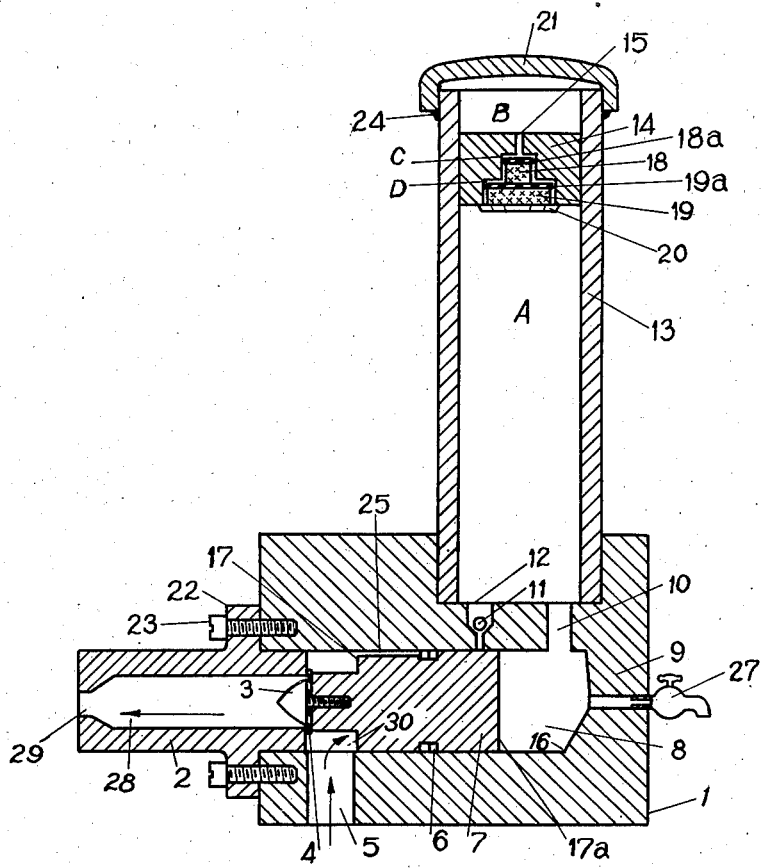
PAUL N. CURRY
INVENTOR.
BY *Robert E. Wadham*
ATTORNEY.

Patented Dec. 11, 1945

2,390,642

UNITED STATES PATENT OFFICE 2,390,642

VALVE

Paul N. Curry, Kalamazoo, Mich., assignor to Durametallic Corporation, Kalamazoo, Mich.

Application March 17, 1943, Serial No. 479,414

9 Claims. (Cl. 137—153)

This invention pertains to valves and particularly to the type thereof which will close when the pressure of a fluid in a pipe falls below a predetermined amount.

The principal object of this invention is to provide a valve of the type mentioned which will close positively and firmly when the pressure falls to a predetermined critical value.

A further object of this invention is to provide a valve of the type mentioned which will have a sufficient force impelling the plunger threof to close that specks of dust, lint, and even small particles of scale will be crushed or pressed into the valve or valve seat and will not prevent absolute stopping of liquid flow.

A further object of this invention is to arrange the direction of application of the force causing closure of the valve the same as the direction of flow of liquid within the system to which the valve is attached.

A further object of this invention is to provide a valve which will remain fully open until pressure changes have taken place sufficient to call for closing and then to close suddenly and completely, and not move down slowly in exact response to pressure changes and close only gradually.

A further object of this invention is to provide a valve of the type described wherein no diaphragm or spring is pressed.

In presently known pop valves wherein a spring loaded valve is held open by the fluid pressure, there is the definite disadvantage that when the pressure falls slowly, the spring may for a time be substantially balanced by the fluid pressure so that the valve closes slowly. It may or may not seat properly and the pressure must drop substantially below the closing pressure before the valve will engage its seat with enough force to crush or press into the seat any particles of lint or scale which may be in the fluid. Further, when the valve is partially closed, it provides a constriction through which flow continues but at which dirt, scale, and other foreign matter becomes deposited, so that when the pressures are such that would normally cause closing there is sufficient accumulation of dirt on the valve seat to prevent complete shut-off. Hence, a pop valve of the known spring loaded type may not seat tightly and reliably unless the pressure drops fairly rapidly and until the pressure has dropped much below what is set as the closing pressure.

In my improved valve I have eliminated the usual spring and have instead secured my closing force by an air trap. More important, however, I have so arranged my valve that the opposed forces do not cause any closing of the valve until it is ready to close tightly and then it closes suddenly and with great force. Thus the valve seats securely, accumulation of dirt on the seat is prevented, and no leakage occurs.

While I use this valve primarily for holding a static hydraulic pressure in a hydraulic system, wherein even slight leakage will destroy the pressure, it is obvious that it is a valve of general use and will find a variety of applications wherever precise and positive valve closing is required.

The valve is fully illustrated by the drawing containing only a single figure which is a partial section taken through the center of the valve and showing all of the essential construction and working parts.

The construction of my improved valve begins with a substantially block-shaped body part 1 having an axial bore part way through. Inserted into the open end of said axial bore is nipple 2 which may be held in place by flange 22 and bolts 23 or in any other convenient manner. Nipple 2 has an axial opening 28 therein which at its inner end communicates with the axial bore within body part 1 and at its outer end has constriction 29. Nipple 2 in normal use will ordinarily also be fitted at its outer end for pipe connection in some convenient manner, but since this is conventional it is not shown in the drawing.

Immediately inward of the innermost portion of nipple 2 is opening 5 in the side of body part 1 which provides communication between the axial bore of body part 1 and the outside of body part 1. It likewise will ordinarily be fitted with pipe connections which may be of any conventional form and hence are not shown here.

Within said axial bore in body part 1 is plunger, or valve, 7. This plunger is constructed in two diameters as shown. Said valve coacts by its smaller diameter with a valve seat provided by the inner end of nipple 2. The said valve end may be provided with resilient or flexible member 4, of material such as rubber, leather, or "Neoprene," which is held in place by tap-screw 3. The head of screw 3 is advantageously extended in substantially conical shape to assist streamline flow of the fluid being handled. Face 17 is located back from the end contacting member 4 a distance sufficient to permit all or most of opening 5 to be uncovered by plunger 7 when said plunger is in the extreme left-hand position as shown in the drawing.

Rings 6 surround the plunger 7 in its larger diameter to prevent free passage of liquid between the larger diameter of the said plunger and the walls of the axial bore in body part 1. These may be of construction similar to piston rings, may be a packing of low frictional characteristics, or any other form of packing convenient for the purpose. Channel 25 is cut into a side of plunger 7 from the face 17 a distance sufficient to reach from said face 17 to hereinafter-identified opening 12 when said plunger is in its extreme rightward position.

Tank 13 is positioned at the side of body part 1 and sealed liquid tight thereto. Its inward end is open and communicates with the axial bore in body part 1 by opening 12 and by opening 10. Opening 10 is free and unrestricted as shown, while opening 12 is provided with check valve 11. Check valve 11 may be of any conventional type but is conveniently of the ball type shown cooperating with a seat provided in opening 12.

Near the top of tank 13 is partition 14 fastened rigidly and in liquid tight manner to the sides of said tank. Opening 15 provides communication through said partition 14 and is closed by float valves 18 and 19. One valve is sufficient to perform the full function but by using a double valve as shown completely reliable closure is better assured. These valves are contained in chambers C and D, respectively, which chambers are provided by widening opening 15. A screen or netting 20 prevents said floats from falling out of place when the liquid is low. Resilient washers 18—a and 19—a, leather, rubber, or "Neoprene," assist in assuring tight closure.

A drain-off opening fitted with a suitable valve 27 is provided from chamber 8 but not necessarily from the lowermost portion thereof.

In operation the valve is direct and positive. Beginning with the valve set in the position shown in the drawing (although if it is in open position the valve will commence operation properly merely by omitting the first hereinafter-mentioned step), oil, or other operating fluid, enters at 5. It surrounds the smaller portion of plunger 7 and exerts pressure against face 17 thereof. There being only air under atmospheric pressure on face 17—a of said plunger, the plunger will move to the right the full mechanically permissible limit of travel. Oil then flows leftward through 28 and 29. The constriction at 29 causes a definite back-pressure to act against the valve.

When plunger 7 is fully rightward, opening 25 communicates with opening 12, and oil will also flow therethrough and into chamber A of tank 13. From said chamber A it will flow through opening 10 into chamber 8. As tank 13 fills with oil, the air contained therein will be compressed in the top thereof until the rising oil level closes valves 18 and 19. Partition 14 is placed so that this occurs before the pressure within 13 and at 8 reaches that within 28. Because of the above-mentioned placing of partition 14 the pressure at B is always held to a predetermined maximum even though the pressure in A rises much higher. The normal operating pressure at 5 extends through 25, 12, A, 10, and 8 so that plunger 7 remains in substantial balance regardless of the exact amount of said operating pressure. As this operating pressure fluctuates at 5 through points above the pressure at B, the pressure at 8, due to the substantial noncompressibility of liquids, will fluctuate correspondingly. Since the pressure fluctuations are equal on both sides of plunger 7, there will be no movement thereof unless such fluctuation goes below the pressure at B. When this happens, the pressure at B will operate through the liquid occupying A, 10, and 8, and cause the plunger 7 to move leftward into its closed position. Hence pressures at 5 can fluctuate with considerable freedom without accidentally closing said valve so long as these fluctuations are all above the amount for which said valve is set to operate, but it will close promptly when the pressure at 5 drops below said amount.

When a break in the oil line occurs, or other accident causing a fall in pressure in the portion 28, the pressure exerted by the air compressed in chamber B will force the oil in tank 13 downwardly to close check valve 11 and exert pressure against the right-hand end of plunger 7. Since portion 16 holds said plunger away from the right-hand end of chamber 8, there is kept available surface 17—a upon which this pressure continuously acts. With the pressure in 28 falling, the pressure on surface 17 and the end of member 3 will fall and plunger 7 will immediately move leftward and valve portion 4 will be pressed tightly against the valve seat. Since there will be no movement of plunger 7 at all until the pressure at 28 has fallen below that in chamber 8 and then it moves rapidly, there will be no gradual closing of the valve and consequent permitting of dirt and scale to gather in a narrowed but not closed opening between the valve and valve seat as occurs in spring loaded valves, but rather the closing will be rapid and definite. Further, since when the valve is closed the pressure remaining statically in opening 5 operates only against the relatively limited area of surface 17 it will be far overbalanced by the force exerted on 17—a, so that the closed valve will be held tightly and with sufficient force to press into the soft material 4 any stray bits of scale which may have been accidentally caught thereon. Thus, the closed valve is tightly closed and leakage is prevented. In reopening, it will be evident that the pressure on surface 17 must first build up to a pressure substantially in excess of the pressure acting on the surface at the other end of the plunger in order that in acting against a smaller surface it will exert a superior total force. However, as soon as the valve is open, the full projected area of the leftward (as viewed in the drawing) end of the plunger is available and a pressure in 5 equal to the pressure in 8 will hold the valve open.

When the hydraulic system is repaired, or otherwise ready to return to circulating operation, active pressure is again imposed on the oil at 5. This being stopped by the closed valve, it quickly builds up on surface 17 sufficiently to overcome the force on 17—a and move the valve rightward. Since there is now a constant pressure on 17—a, constriction 29 or an equivalent must be present to provide a constant though limited build-up of the pressure in 28 exceeding that in A and 8. This holds plunger 7 firmly rightward. Obviously, in some installations it will be desirable to make constriction 29 adjustable, and this may be readily accomplished by any of many conventional valves or regulators.

Since one major use of this valve is for handling oil, as has been indicated by the mentioning of oil in the above discussion, and since oil will in time absorb air held over it under pressure, it becomes necessary to drain tank 13 at intervals to release air-saturated oil and permit fresh oil and air to enter tank 13. While this process might be replaced by injecting new air into the top of tank 13, it has been found better in practice to drain the tank as indicated. For this purpose drain 27 is provided. This drain may or may not be at the lowermost limit of tank 13 and chamber 8 as is convenient in the particular installation, since complete drainage is not necessary if only most of the oil is drained out and new air permitted to enter.

Partition 14 and its valves may be omitted if frequently repeating action is not desired, or if the tank 13 can be drained after each valve operation, but such omission is advisable only where the speed of flow is not likely to move the valve leftward by mechanical contact if the pressure at 8 balances that at 30. Otherwise, it, or some other means of limiting the compression of air in chamber B, should be provided for the reasons above given. However, there can doubtless be supplied other effective means to this end, so that my invention should not be limited to the use of this particular detail excepting where the claims expressly require.

Other alterations will be apparent which are all within the scope of my invention. Examples are: eliminating nipple 2 and forming the valve seat and constriction 29 as parts of the axial opening in body part 1; placing tank 13 parallel to the direction of travel of plunger 7; omitting the streamlining of bolt-head 3, although this latter may impair smooth operation of the valve; channel 25 might be replaced by an opening through body part 1 connecting with opening 12 and opening into the axial opening within said body part in position to be uncovered by plunger 7 only when said plunger is in fully rightward position.

Having thus fully disclosed my invention, I claim:

1. A retaining valve comprising in combination: a body part having a cylindrical opening therein and a side opening providing communication from said cylindrical opening intermediate its ends through the side of said body part to the exterior thereof; a cylindrical plunger having two diameters along its length of which one provides a close sliding fit with the walls of said cylindrical opening in said body part, and the other is of reduced diameter forming a valve, and a channel along the side of the portion of large diameter beginning at its end adjacent the portion of smaller diameter and extending partway to the other end thereof; a nipple having a cylindrical opening therethrough communicating at one end with the end of said cylindrical opening in said body part approached by the valve portion of said plunger and fitting within said opening forming a valve seat coacting with said valve, and said cylindrical opening in said nipple being constricted at one point thereof; the whole arrangement placing said side opening between the valve seat and the larger diameter of said plunger in any position thereof; a tank which is air tight excepting for two openings therein of which one is provided with a check valve and communicates with said channel in said plunger when the plunger is in fully withdrawn position and the other communicates freely with the said cylindrical opening in said body part at the end thereof approached by the larger diameter portion of the plunger; means within said tank limiting the extent to which it will fill with liquid; and means permitting selective draining of said tank.

2. A retaining valve comprising in combination: a body part having a cylindrical opening therethrough closed at one end and provided with a valve opening and valve seat at the other end, means connecting said valve opening with external means and a constriction between said means and said valve opening; inlet means through the side of said body part entering said cylindrical opening adjacent said valve seat and inwardly thereof; a cylindrical plunger fitting said cylindrical opening closely but slidably, means carried on one end of said plunger providing a valve coacting with said valve seat and being of less diameter than said plunger; a tank associated with said body part which is fluid tight excepting for two openings of which one communicates with means providing one-way communication between it and said cylindrical opening in said body part adjacent said side opening thereof, when said plunger is in its extreme valve opened position but which last-named means are closed when said plunger is in any other position; and the other of said two openings providing communication from the interior of said tank to the end of said cylindrical opening in said body part remote from the valve end of said plunger.

3. A retaining valve comprising: a body part having a cylindrical opening therein which opening has a closed end and an open end; a valve seat provided at the open end; outlet means from said valve including a constriction; inlet means through the side of said body part opening into said cylindrical opening adjacent and inward of said valve seat; a closely fitting slidable plunger within said cylindrical opening carrying on one end thereof a valve coacting with said valve seat in one position of said plunger but of diameter less than that of said plunger; air containing means associated with said body part; one fluid conducting means from said air containing means to said cylindrical opening adjacent said inlet opening therein which means is open for conduction of fluid only when said valve is in fully opened position and another fluid conducting means providing continuous communication from said air containing means to said cylindrical opening in said body part at the end thereof remote from said inlet opening therein.

4. A liquid controlling valve mechanism comprising: a valve body part having a valve receiving cavity therein and a two-diameter sliding valve in said cavity and seating by the smaller diameter; inlet means providing entry into said cavity at a side of said valve and outlet means including a constriction at an end of said valve; means taking off liquid from within the valve cavity at the end of the valve adjacent the valve seat and conducting said liquid to a tank and positive means limiting the extent to which said tank will receive said liquid; a compressible gas within said tank; means conducting fluid from within said tank back to the valve cavity on the end thereof remote from the valve seat, said valve cavity being closed at said end and said liquid being introduced thereinto between said closed end and the nearest end of said valve when same is in its extreme open position; whereby on failure of liquid pressure at the end of the valve adjacent the valve seat pressure exerted by the compressible gas will act through the liquid and on the end of the valve remote from the valve seat and cause it to move onto said valve seat and be held there firmly.

5. In a valve mechanism including a pressure tank for the compression of an elastic gas by admission of liquid under pressure, means within said tank limiting the volume of said tank filled by said liquid whereby to limit the maximum compression of said gas.

6. In a valve mechanism wherein operating pressure for movement of said valve is attained by compression of an elastic gas within a tank by a liquid under pressure, a partition within said tank having an opening therethrough and a float valve closing said opening when the liquid reaches a predetermined level.

7. The method of controlling a shut-off valve comprising: building a pressure on the downstream side of said valve and causing said pressure to urge said valve to open position; using liquid from within said valve to compress an elastic gas; limiting the extent of compression of said gas to a pressure less than that existing on the downstream side of said valve; holding the pressure of said elastic gas against escape and causing it to act continuously against said valve urging it to closed position, whereby to close same upon failure of the pressure on the downstream side of the valve.

8. A retaining valve comprising: a body part having a cylindrical opening therein, which opening has a closed end and an open end; a valve seat provided near the open end; outlet means from said valve including a constriction; inlet means into said body part opening into said cylindrical opening; a closely fitting slidable plunger within said cylindrical opening carrying on one end thereof a valve co-acting with said valve seat in one position of said plunger but of diameter less than that of said plunger; means associated with said body part containing a compressible gas; one liquid conducting means from said gas-containing means to said cylindrical opening adjacent the said inlet opening therein, which means is open for conduction of liquid only when said valve is in fully opened position, and another liquid-conducting means providing continuous communication from said gas-containing means to said cylindrical opening in said body part at the end thereof remote from said inlet opening therein.

9. Means controlling a shut-off valve comprising: means building a pressure on the downstream side of said valve and means causing said pressure to urge said valve into open position; means utilizing liquid from within said valve to compress an elastic gas; means limiting the extent of compression of said gas to a pressure less than that existing on the down-stream side of said valve; means holding the pressure of said elastic gas against escape and causing it to act continuously against said valve and urging it to closed position, whereby said valve will be closed upon failure of pressure on the down-stream side of said valve.

PAUL N. CURRY.